Feb. 27, 1934.  A. F. SPITZGLASS ET AL  1,949,222
SWITCH CONTROL APPARATUS
Filed July 15, 1929   3 Sheets-Sheet 1

Inventors
Albert F. Spitzglass and
Otto T. Handwerk.
by James B. Lewis
Attorney

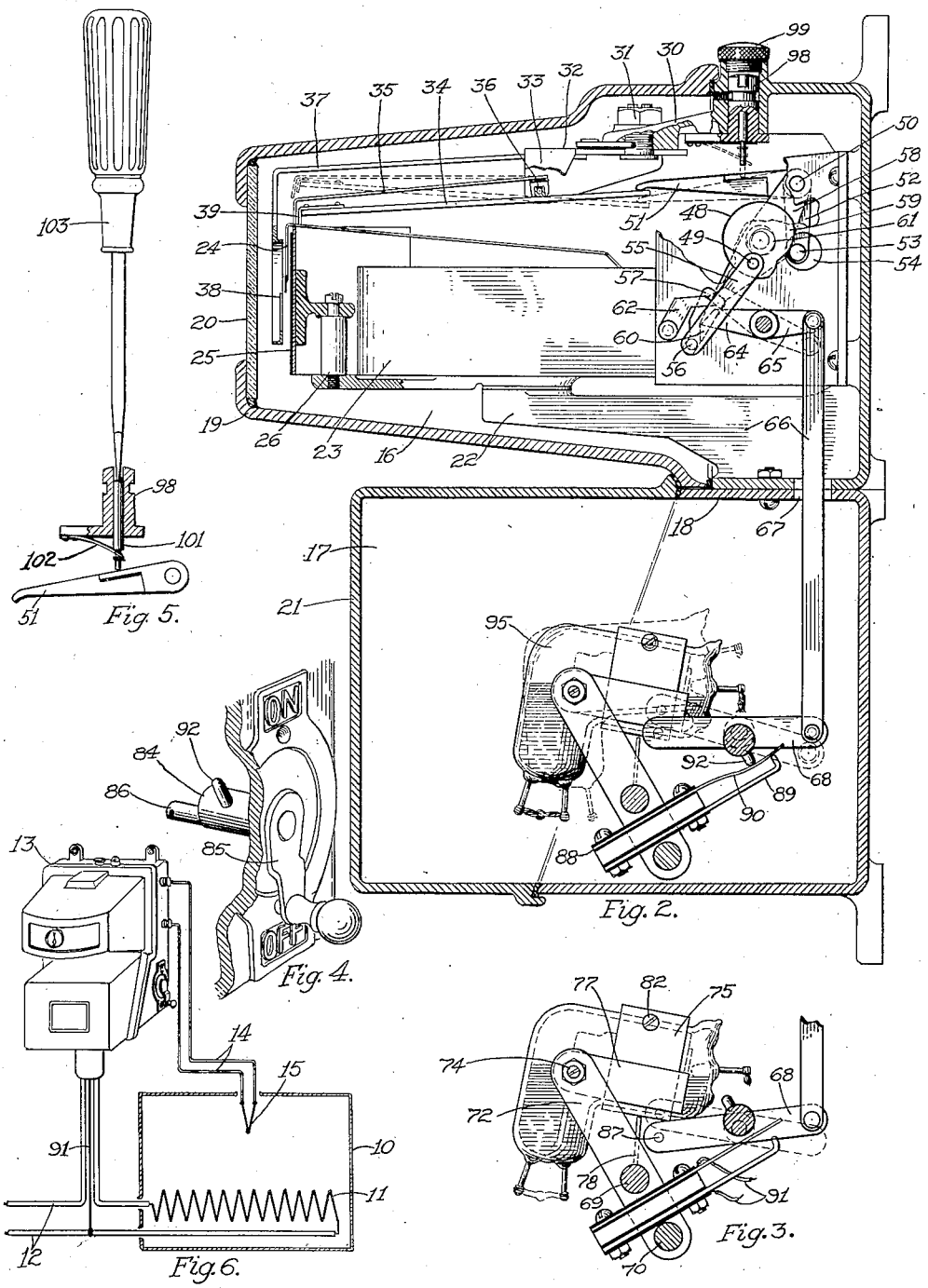

Feb. 27, 1934.　　A. F. SPITZGLASS ET AL　　1,949,222
SWITCH CONTROL APPARATUS
Filed July 15, 1929　　3 Sheets-Sheet 3

Inventors
Albert F. Spitzglass, and
Otto T. Handwerk.
by James B. Lewis
Attorney Patented Feb. 27, 1934

1,949,222

UNITED STATES PATENT OFFICE 1,949,222

SWITCH CONTROL APPARATUS

Albert F. Spitzglass and Otto T. Handwerk, Chicago, Ill., assignors to Republic Flow Meters Company, Chicago, Ill., a corporation of Illinois Application July 15, 1929. Serial No. 378,203

13 Claims. (Cl. 200—56)

This invention relates to temperature control means for heated apparatus of various kinds such as ovens, furnaces, etc. and has for its object the provision of simple and reliable means for automatically controlling the temperature of said heated apparatus in a predetermined manner.

The general purpose of the invention is the provision of an improved pyrometer control apparatus capable of general application.

A particular purpose of the invention is to provide a pyrometer control apparatus suitable for the direct control of current to the heating unit of an electric furnace, oven, or the like. The control of the current is accomplished by the direct making and breaking of the circuit carrying the main heating current thereby eliminating secondary circuits, such as are ordinarily employed in control apparatus, which circuits are controlled from the pyrometer and which in turn, operating through solenoids and such mechanism, make and break the main circuit to control the heating unit.

An important object of the invention is the provision of a device which is suitable for heavy duty work, that is, will operate from a very sensitive movement, such as the armature of a galvanometer or millivoltmeter of a pyrometer, and at the same time give great power without affecting the sensitivity of the movement.

The foregoing and other objects are obtained by the device illustrated in the accompanying drawings and described below. It is to be understood that the invention is not limited to the specific form thereof shown and described.

For a more complete understanding of the invention reference should be had to the accompanying drawings, wherein the same reference numerals are used to designate corresponding parts in the several figures:—

Fig. 2 is a side sectional view showing certain parts in section and other parts in elevation;

Fig. 3 is a detail view showing the mercury switch operating mechanism and the clock control switch in the off position;

Fig. 4 shows the switch operating handle in off position;

Fig. 5 shows a detail;

Fig. 6 is a diagram illustrating an application of the invention to the control of an electric furnace.

Figure 1:
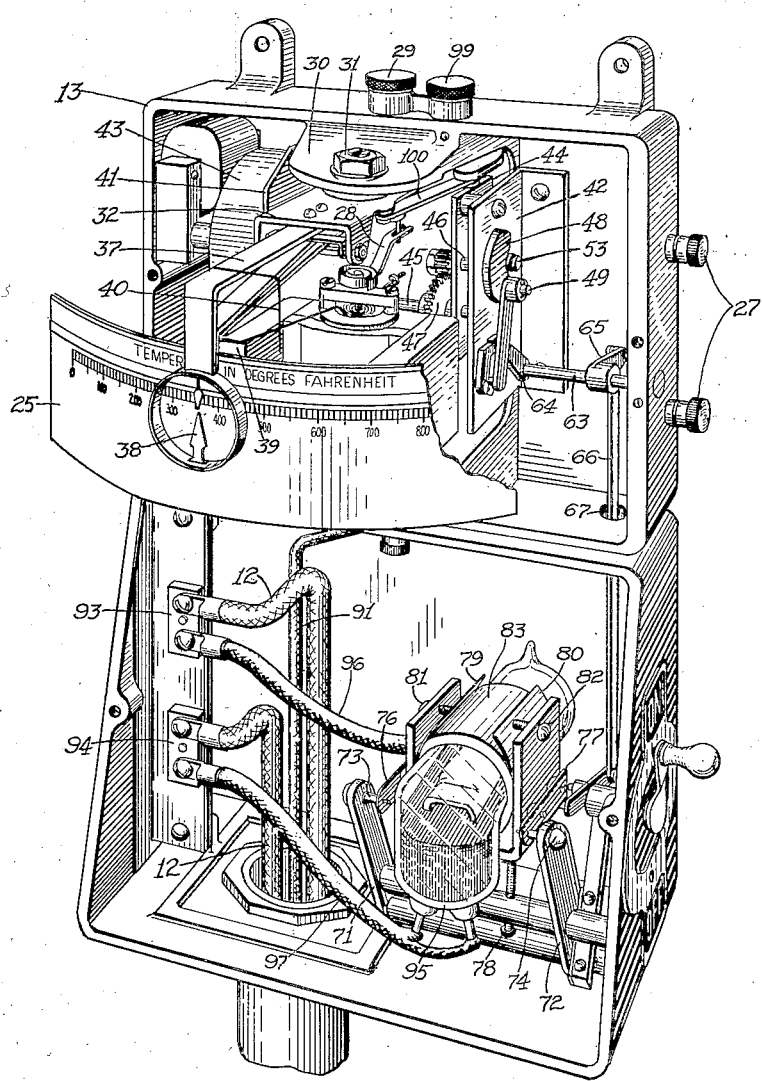
Fig. 1 is a perspective view of the device with the front cover of the casing removed to better show the interior mechanism.
Figure 9:
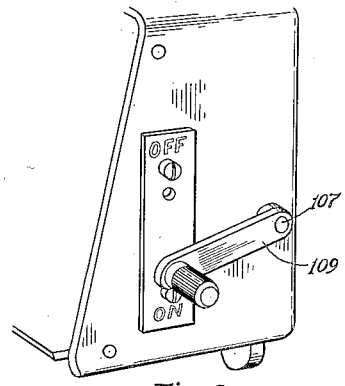
Figs. 9, 10 and 11 show structural details.

Referring more particularly to the control system illustrated in Fig. 6 of the drawings, there is shown generally a heated device 10 that may, for purposes of illustration, be considered as a furnace that is heated by an electric heating element 11. Both the furnace structure 10 and the heating means 11 may be of any suitable or desired type, and as they form no part of the present invention, are not illustrated or described in detail.

Energization of the heating element 11 is effected by current supplied thereto through conductors 12 from a suitable source of electrical energy, not shown, and one of the conductors has connected in series therewith a suitable circuit making and breaking mechanism housed in the casing 13, later to be described in detail, whereby the heating element may be energized or de-energized and the temperature of the heated unit 10 correspondingly controlled. The circuit making and breaking mechanism is controlled in its operation by an electro-responsive device, also housed in casing 13, that is energized, through leads 14, by a thermo-couple 15 preferably located within the furnace structure to be subjected to the temperature of the heated device.

The casing or housing 13, provided with suitable means whereby it may be secured to a support or panel, is preferably divided into two compartments 16 and 17 separated by a partition or dividing wall 18 and the electro-responsive mechanism is housed in compartment 16 while the circuit making and breaking mechanism is housed in compartment 17. The compartment 16 has a detachable cover 19 provided with a transparent portion 20 through which the readings of the thermo-responsive mechanism may be observed and the compartment 17 is closed by a detachable closure or cover 21 and a gasket is interposed between each cover and casing to provide a dust-proof housing, thus the two mechanisms are housed in separate compartments which, although not actually required, has been found desirable from a practicable viewpoint. With the two mechanisms thus housed in separate compartments explosion of the mercury switch, which is likely to occur if too great a load is placed on conductors 12 through short circuiting or burning out of the heating elements 11 or otherwise, does not harm or render inoperative the thermo-responsive device by throwing mercury thereover or corroding the parts by the gases given off by the burning of the mercury when the explosion or burning out of the switch takes place as might occur if said mechanisms were located in the same compartment.

Referring now to Figs. 1 and 2, the compartment 16 has a casting 22 therein for supporting the thermo-responsive device which may be and is illustrated as a galvanometer or millivoltmeter and which consists broadly of a permanent magnet 23 and an armature mounted for oscillation and carrying an index or pointer 24 for cooperation with a scale 25, graduated in terms of temperature or the like for indicating the temperature or other conditions to be controlled. The scale is carried by suitable supporting means 26, in position to be observed through the window 20, and the armature is connected through suitable conductors to the binding posts 27 to which the leads 14 from the thermocouple 15 are connected. The zero adjusting means of the thermoresponsive means is operable from the outside of casing 13 after removal of the dust cap 29. Since the thermoresponsive device per se may be of any suitable or desired type and as it forms no part of the present invention further detailed illustration or description thereof is deemed unnecessary.

A web or casting 30 extends slightly forward from the housing 13 and pivotally supports by means of the shoulder bolt 31, the axis of which is preferably in alignment with the axis of the armature, a yoke member 32 provided with ears 33 for supporting a depressor 34 and a holder 35 from the pin 36 carried by said ears. Secured to the yoke and extending forwardly therefrom is an arm 37 provided with a depending portion for supporting the target 38 in close proximity to the scale 25 and in position to cooperate with the end of the index 24 for a purpose to be later described.

The holder 35 is of appreciable width and is provided with a depending portion lying in the same vertical plane as that of the scale 25 so that the bottom edge of said portion will normally contact with the upper edge of the scale 25. This depending portion is adapted to overlie and normally contact the pointer 24, when said pointer is in approximate registration with the target, to press the same against the upper edge of the scale and thereby maintain it in fixed position with reference to the target.

Depressor 34 is pivotally supported intermediate its ends on the pivot 36 in such position that the forward portion thereof underlies the holder 35 and when said portion is elevated it also raises said holder as will be apparent from the dotted line position shown in Fig. 2. The forward end of the depressor is provided with an angularly disposed index engaging part 39 so proportioned that it engages the pointer only within small limits that is when the pointer is only within the space defined by the target 38 and the bumper 40 carried by arm 37. The bumper or stop 40 depends below the path of the pointer 24 and limits the up scale movement thereof to a position such that if it should pass the target, while the holder and depressor are in raised position, it will be retained in position to intercept the depressor as it descends to its lowered position for a purpose to be hereinafter explained. The rear portion of the depressor terminates below the bolt 31 so that when the member 32 is turned about said bolt the rear portion will remain in position as though pivoting around the axis of said bolt.

Mechanism supporting plates 41 and 42, mounted in compartment 16, carry the power means and the transmitting mechanism. While the power for driving the transmitting mechanism is shown as derived from an electrically operated clock 43 of well known construction, supported from plate 41, it is to be understood that any other suitable power means either of the continuous or intermittent type may be employed. Plate 42 has a second plate 44 spaced therefrom and said two plates form a frame construction for supporting the selector mechanism which transmits the motion of the power driven device, as controlled by the thermoresponsive device, to the switch to control the temperature of the furnace 10. A shaft 45 journaled in plates 42 and 44 and driven by the clock 43 drives a second shaft 46 journaled in plates 42 and 44 through gearing 47. The second shaft 45 extends through plate 42 and has a cam 48 mounted on the end thereof and the cam has a pause or dwell therein and carries an eccentrically located pin 49.

A bell crank pivotally supported as at 50 in the plates 42 and 44 has an arm 51 projecting forwardly and resting upon the rear end of the depressor 34 and a depending arm 52 provided with a pin or roller 53, projecting through an enlarged opening 54, in plate 42, in position to ride upon the periphery of the cam 48. The weight of the forwardly extending portion of the depressor is such that it normally raises the arm 51 resting upon the rear part thereof, thereby causing the pin 53, carried by the depending arm of said bellcrank, to contact with and ride upon the periphery of said cam.

The pin 49 pivotally supports and operates a link 55 provided with a selector engaging pin 56 projecting through an opening 57 in plate 42 to a point well beyond the plane of said plate to engage the selector. Said selector takes the form of a rocking bar 58 pivoted, at its upper end, on the pivot 50, having a pin engaging portion 59 and a lower elongated cam portion 60 which lies adjacent to and projects well across the opening 57 in position to engage the pin 56 in certain positions thereof. Said bar has an enlarged opening 61 therein through which the second shaft 46 extends and which is sufficiently large to allow the bar to oscillate about the pivot 50 within the limits of said opening. The relationship of the opening 57 and the cam portion 60 of the selector is such that, when the selector is in the down position, as shown in Fig. 2, the pin 56 will ride upon the cam 60 in the slot formed by the upper edge of said cam and the adjacent edge of the opening 57 and that, when the selector is in the raised position, the pin will ride upon the edge of the opening 57, to the rear of the cam 60 in the path formed by the rear edge of the cam and the adjacent edge of the opening 57. As will thus be apparent the pin has an upper and a lower path in which it may travel and that the path it takes depends upon the position of the selector. The lower end of the cam 60 of the selector is free to swing by the pin 56 when the pin is in the lowermost point of its travel as shown in Fig. 2, and the movement of the parts are so synchronzed that the movement of the selector takes place when the pin 56 is in its lowermost position. A pawl 62 pivotally supported on plate 42 in position so that a portion thereof projects into the upper path near the upper limits thereof is adapted to be operated by the pin 56 when it travels in said path. A shaft 63, having its ends journaled in plate 42 and a wall of compartment 16 respectively, has a finger member 64 secured thereto with the free end of said member extending well across the opening 57 in position to rest upon pawl 62 and to be retained in raised position by said pawl, as shown by the dotted line position in Fig. 2 and the full line position Fig. 1, but the end of said member clears the upper path when the member is in lowered position as clearly shown in Fig. 2.

With the member 64 in the full line position of Fig. 2 the pin 56 is free to reciprocate in the upper path without operating said member. However, when the selector moves to the upper position, as it will if the roller 53 rides into the dwell of the cam 48 since the pin 53 contacts with the pin engaging portion 59 and moves the selector to the left, as viewed from Fig. 2 into the raised portion, the pin 56 will take the lower path and as it ascends it raises the member above the pawl where it is retained when the pin descends and as long as the pin travels the lower path. When the selector is in the lower position, the pin 56 travels the upper path and in due time contacts with the pawl and raises the same above the end of member 64 thereby freeing the end of said member which then rests upon said pin and rides thereon as it descends until the end of the member slides off of said pin and drops a short distance to the position shown in Fig. 2 where it is entirely clear of the upper path. The member 64 is thus slowly lowered from the raised to the lowered position and this is an important feature since it causes the mercury switch to properly function in breaking the circuit. It will also be noted that the relative position of the pause or dwell of the cam and the pin 49, carried by said cam, is such that the pin is just starting on its upward travel when the roller 53 is in the lowest part of the dwell. By this arrangement the movement of the selector and the pin 56 is so synchronized that said pin is in the lower limit of its descent when the selector is shifted from one position to another. Another feature that may be noted is that the pause or dwell is so shaped that the arm 52 of the bell crank is pushed to its extreme outward position, by roller 53 riding out of the dwell upon the circular periphery of the cam, before the pin 56 contacts with and begins to raise the member 64. This has the advantage of distributing the load so that the clock performs the two functions successively rather than simultaneously and less strain is therefore placed upon the clock.

The shaft 63 has a crank arm 65 secured thereto and this crank pivotally supports a link 66 extending through an opening 67, in wall 18, into the compartment 17 where it is connected to one end of a switch operating lever 68.

There is housed in compartment 17, a switch supporting mechanism including horizontally disposed rods 69 and 70, supported as at one end from a wall of the casing, carrying spaced apart standards 71 and 72 provided, adjacent their free ends, with bearing pins 73 and 74, respectively. This structure forms a rigid support for the mercury switch carried in a cradle mechanism consisting of a U-shaped member 75 to the legs of which are secured bearing plates 76 and 77 provided with eyes through which the pins 73 and 74 extend to provide bearings for said cradle. The cradle and the bearings therefor are so correlated that, when the switch is secured in position in the cradle, the axis of the bearings lies slightly to the left of the center of gravity of the switch and cradle, as viewed from Fig. 2, and in consequence thereof the switch has a tendency to occupy the position shown in Figs. 2 and 3, which is the off or open position of said switch. While this construction is practicable and lends itself readily to construction and ease of assembly, it is to be understood that other mounting means may be substituted therefor and that the switch may be biased by other means, such as springs, weights, etc. A stop 78, shown as a screw passing through rod 60, adapted to contact with the bottom portion of the cradle, limits the downward movement of the switch and retains it in the correct off position. The switch is retained in position in the cradle by resilient strips 79 and 80, carried by the legs of the U with the tops thereof adapted to be pressed inwardly or toward each other, by screws 81 and 82 carried by said legs, to securely clamp the mercury switch therebetween, as clearly shown in Fig. 1. Before the switch is placed in the cradle a resilient band or gasket 83 is placed therearound in position to receive the pressure of the resilient strips 79 and 80 when they are forced inwardly by the screws 81 and 82. By this arrangement the switch can be rigidly secured in position in the cradle without danger of cracking or otherwise breaking the casing thereof.

The parts thus far described operate as follows. When the handle 85 is moved to the on position the motor 43 starts up thereby rotating cam 48. Pin 53 rides upon the periphery of said cam and when it traverses the dwell therein the depressor dips or beats across the path of the pointer, if the pointer is below the predetermined temperature for which the target 38 has been set. As the pin 53 rides into the dwell of the cam it contacts with and pushes the selector 58 to the left as viewed from Fig. 2 and the operating pin 56 travels up the back of the selector and raises the finger 64 to the dotted line position where it is retained by pawl 62. Movement of the finger to its elevated position also moved the mercury switch 95, through link 66 and lever 68, to the dotted line or closed position where heating current is supplied to the furnace. As long as the pointer is below the target the depressor will beat across the path thereof, the selector will be moved to the left so that the operating pin will travel up and down to the rear of the selector and the finger 64 will remain in elevated position thereby holding the switch in closed position whereby the temperature of the furnace will continue to increase.

When the temperature of the furnace reaches the predetermined point to which the target has been set, the index 24 registers therewith and is in the path of the depressor. Now when the depressor is lowered it will contact with the index and further downward movement thereof will be arrested hence the pin 53 will not ride into the dwell sufficiently to contact with the selector and said selector will remain in the position shown in Fig. 2 and the operating pin 56 will ride up the front thereof to raise or release the pawl 62 from the finger 64. After the finger is released from the pawl it rests upon the pin 56 and as said pin descends it is lowered until it slides off of said pin then drops to the full line position, seen in Fig. 2, which is its lower or normal position. Movement of the finger to its lower position also moved the mercury switch to its normal or off position where the circuit to the furnace is broken and the heating thereof discontinued. As long as the temperature remains at the point desired the depressor will be intercepted by the pointer, the selector will remain in the position shown in Fig. 2, the operating pin will reciprocate along the front of the selector and the switch will remain in open position. When the temperature of the furnace has dropped sufficiently to cause the pointer to move down scale, out of range of the depressor, the depressor will again beat across the path of said pointer and the operations first described will be repeated.

During the operation of the device it may be desirable to disconnect the switch cradle mechanism from the operating means therefor and to that end the following means are provided. A shaft 84, suitably supported, extends through one wall of the compartment and has affixed to its exterior end a handle 85 by which the shaft may be operated from outside the casing. Suitable legends, such as on and off are provided to indicate, when the handle is in registry therewith, the relative positions of the switch mechanism and the operating means therefor. When the handle is in the on position the switch mechanism and its operating means are operatively connected and the switch will be operated by said means, but when the handle is in the off position the switch mechanism is effectively disconnected from the operating means and remains in the off or open position.

The shaft 84 carries an eccentrically located part, shown as a pin 86, upon which the lever 68 is fulcrumed and the relative positions of the pin and handle are such that when the handle is in the on position the pin is at the top of the arc, through which it moves, and the end of the lever adjacent the switch will, when raised by depression of link 66, move the switch to the closed or dotted line position, shown in Fig. 2. With the handle 85 in the off position the pin 86 is in the lowest point of its movement and the fulcrum of the lever 68 has been so lowered that the lever will not operate the switch.

Figure 2 shows the operating position of the lever 68 when the handle is in the on position while Fig. 3 shows the off position of said lever. As will be obvious the arrangement is such that shifting of the handle from the off to the on position raises the arc through which the operating end of lever 68 travels and that the lowest point of said arc corresponds to the open position of the switch while upward travel of the end of the lever moves said switch to its closed position as shown by the dotted lines in Fig. 2. In Fig. 3, which is the off position, the travel of the end of lever 68 is such that its maximum upward travel corresponds to substantially the open position of the switch as illustrated by the dotted lines in said figure. The relative positions of the arcs, through which the operating end of the lever travels, corresponding to the on and off positions of the handle, are such that the lower limit of the upper arc coincides with the upper limit of the lower arc and this point of coincidence coincides with the open position of the mercury switch.

Movement of lever 68 is transmitted to the mercury switch cradle through a pin 87, carried by said lever, which cooperates with the adjacent bearing plate 77 by contacting with the lower edge thereof. While this forms a convenient means for transmitting the movement of the lever to the switch it is apparent that other means may be as efficacious and that such means may be substituted for those shown.

When the power means is an electrically operated means, as for example an electric clock, operation thereof may be controlled by operation of the handle 85 in such manner that when the switch and the operating means therefor are disconnected the clock will also be stopped and when the switch and its operating means are connected the clock will be put in operation. As one means of accomplishing this result the following mechanism has been developed.

A switch 88, including a contact 89 and a leaf spring 90, cooperating in closed position with said contact but normally occupying an open position removed from said contact, is connected in series in one of the leads 91 to the clock and controls the operation of said clock. The contact and spring, made of conducting material and insulated from each other, are connected in one of the leads, as shown in Fig. 3 and the switch is conveniently mounted on the standard 73 although it can obviously be supported by any other suitable means. Operation of the switch is affected by a stud or knob 92, carried by shaft 84, so arranged relative to the handle and pin 86 that when the handle is in the off position the pin will be away from the spring 90, which will then assume the open position, as shown in Fig. 3, and when the handle is in the on position the stud will bear against the spring and thus press the spring against the contact and hold it in the closed position shown in Fig. 2. The mechanism described thus provides a dependable, positively acting, and relatively simple means whereby operation of the mercury switch and clock may be simultaneously controlled by a single operation.

As afore described, one of the conductors 12 extends through a closely fitting tubular member into compartment 17 of casing 13 where it is severed and the ends thereof connected to binding blocks 93 and 94, respectively. Connection from said blocks to the switch 95 is through flexible leads 96 and 97 leading from blocks 93 and 94 respectively to opposite ends of the switch, as clearly shown in Fig. 1.

While a particular type of mercury switch has been shown it is to be understood that other types of such switches may be used in lieu thereof so long as they comply with the prerequisites of the installation, that is, be capable of handling high loads such as are necessary in the operation of electric furnaces, heating units, and the like.

In order that the target 38 may be set to a predetermined temperature, which it is desired be maintained in the heating furnace, without opening the casing a target adjusting means is provided. This means includes a rotary plug member 98, preferably mounted in the casing 13 above the arm 51, having an arm or eccentric part at its lower end and provided with an axial bore. The top of the plug is provided with a kerf intersecting the axial bore through said plug. A dust cap 99 covers the opening housing the plug and thereby prevents dust, water and other foreign matter from entering the casing through the adjusting mechanism. A link 100 interconnecting the arm of the plug and the yoke 32 serves as a means for transmitting rotary motion of the plug to the target for adjusting said target from one position to another without the necessity of opening the casing.

A pin 101 is retained in the axial bore of plug 98 by a spring 102 with the top thereof projecting into the kerf and its lower end above the arm 51 so that when said pin is depressed it will engage and depress said arm and thereby raise the depressor 34 and holder 35 above the path of the pointer thus allowing a free setting of the target without interference with the pointer. To set the target the dust cap is removed and an instrument 103, such as a screw-driver, is inserted in the kerf and pressed downwardly therein and rotated sufficiently to move the target to the desired position. When the instrument is inserted in the kerf it contacts with the pin and pushes said pin downwardly with the consequent elevation of the depressor and holder above the path of the pointer. This mechanism provides a means whereby the depressor and holder may be automatically raised above the path of the pointer when the target is adjusted thereby avoiding possible injury to the thermo-sensitive device and pointer during the setting operation, for if the depressor and the holder are in the lower position movement thereof, as when setting the target, would also swing the pointer, if it was in the path of such movement, with possible injury thereto and to the thermo-sensitive device.

Figure 7:
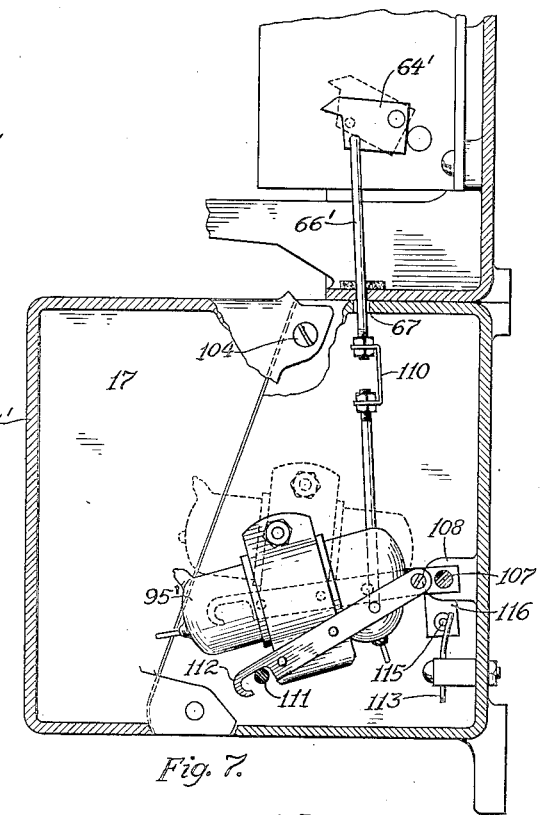
Fig. 7 shows a modified switch operating mechanism and casing therefor.
Figure 10:
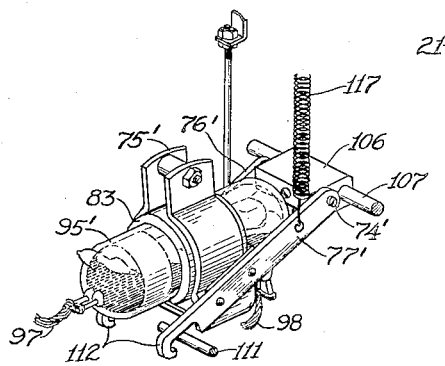
Figure 11:
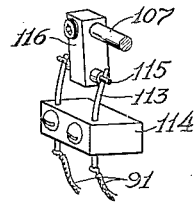
Figure 8:
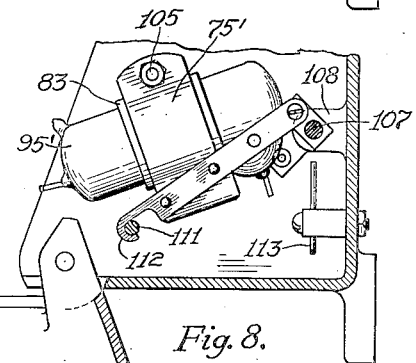
Fig. 8 shows the door of the casing open and the switch in locked position.

In Fig. 7 the door 21' is hingedly connected to the casing where it may be moved to open position, illustrated in Fig. 8, without possible injury to the mercury switch and the door may be retained in closed position by screws 104 as shown in Fig. 7.

Referring to Figs. 7 to 11 inclusive, U-shaped member 75' takes the form of a clamp and is adapted to have its ends drawn together by a bolt 105 to securely hold the switch 95' in position. Bearing pins 73' and 74' for plates 76' and 77', are carried by a block 106 secured to shaft 107 journaled in suitable supports, such as lugs 108. This shaft 107 passes through one wall of the casing and has secured to the exterior end thereof a handle 109 by means of which the shaft may be rotated and secured in one of two positions as the on or off position illustrated in Fig. 9.

Link 66', provided with a modified turnbuckle 110 whereby the length thereof may be varied for adjustment purposes, has its upper end connected to finger 64' and its lower end connected to one of said plates 76' or 77', whereby the switch may be moved from open to closed position and vice versa by movement of finger 64' when it is operated by pin 56.

A stop 111 is provided to limit downward movement of the forward ends of plates 76' and 77' and when said plates rest upon said stop the mercury switch 95' is in the open position. The forward ends of the plates are provided with hooks 112 adapted, when in certain position, to engage the stop 111 and securely hold the switch in open position. This is a desirable feature as the switch may be locked in one position as in shipping and be thus maintained in that position thereby avoiding possible injury, incident to rough handling.

One of the leads 91, to the motor, terminates in contact fingers 113 carried by a bakelite block 114 suitably supported as from the wall of the casing and a rod 115 insulated from and carried by block 116 secured to shaft 107 is adapted to close the circuit between said fingers to operate the motor 43 when the shaft is in the on position.

In order that the pivot pins 73', 74', may be relieved of some of the weight of the mercury switch and its supporting mechanism a spring 117, having one end suitably anchored as to the casing and its other end connected to one of said plates 76', 77', is provided and this spring also aids in raising the switch to closed position by pulling upwardly thereon.

When the handle 109 is in the on position the parts occupy the full line position shown in Fig. 7 with the switch 113, 115, closed and when the finger 64' is raised by pin 56 the mercury switch will be moved to the dotted line position which is the closed position with current being supplied to the heating element. Finger 64' will be retained in its raised position by pawl 62 until the temperature of the heating unit reaches the point desired at which time it will be moved to the full line position or the off position where the current to the heating unit is cut off. When the temperature of the unit falls below the predetermined point desired the switch will again be moved to the dotted line position and it will thus be apparent that the switch will be moved from one position to the other to maintain the temperature of the heating unit at the point desired.

Movement of handle 109 from the on to the off position moves the parts from the full line position of Fig. 7 to that of Fig. 8 where the hooks 112 are brought into holding engagement with stop 111 thereby locking the parts in position, the block 116 is moved away from contact fingers 113 thereby breaking the circuit to the motor 43 and block 106 is rotated upwardly whereby the pivot pins 73', 74', for plates 76', 77', are elevated. This elevation of the fulcrum point for the plates also raises the pivot point of link 66' to such a position that the finger 64' is raised to a point corresponding substantially to the dotted line position seen in Fig. 7 which is the highest position of the finger. With the finger in this position the switch mechanism is thus effectively disengaged or disconnected from its operating means.

When the covers 19 and 21' and dust caps 29 and 99 are secured in position the mechanism is housed in a substantially dust and moisture proof casing which excludes the entrance of any foreign matter to the mechanism thereby prolonging the life and accuracy of such mechanism. This type of casing is desirable since the mechanism, while rugged and capable of long and continued use, is susceptible to wear occasioned by dust, grit, moisture, etc. and especially where the installation is in a mill, furnace room and the like, where the air contains an unusually high percentage of foreign matter.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other means.

Part of the subject-matter described above, relating more particularly to the switch and actuating mechanisms and their mountings, is covered by our divisional application No. 707,714, filed January 22, 1934.

Having thus described our invention, we claim:

1. In a temperature control device, the combination of a temperature sensitive index, an adjustable target, a pivotally mounted depressor oscillatable across the path of the pointer and adapted to be intercepted thereby when the latter is in the path of the depressor, means for adjustably positioning said target and depressor and means automatically operable incident to a resetting operation of the target and depressor for maintaining the depressor clear of the path of the pointer.

2. In a temperature control apparatus, a movable member positionable in accordance with the temperature to be controlled, a pivotally supported target adapted to swing in a path parallel to the path of the member, an oscillatable depressor carried by said target and adapted to oscillate across the path of the member and to be intercepted thereby in certain positions thereof, a housing for said member, target and depressor, means operable from the exterior of the housing for adjustably positioning said target and depressor and means automatically operable as an incident to the adjusting operation for restraining said depressor away from the path of the member.

3. In an instrument of the type described, the combination of an index, a depressor arranged to be intercepted by said index, means for changing the position of the depressor, and means for restraining said depressor away from said index including a plunger movable axially of said means.

4. In an instrument of the type described, the combination of an index, an oscillatable depressor arranged to be intercepted by said index, an angularly-movable device for changing the position of said depressor, and a manually operable member movable along the axis of movement of said device for restraining said depressor out of contact with said index.

5. In an instrument of the type described, the combination of an index movable in a plane, an oscillatable depressor arranged to beat across said plane and to be intercepted by said index in certain positions thereof, means whereby the depressor may be adjusted to different positions, and a part engaged and operated by a tool acting on said means for restraining the depressor away from the plane of the index during the adjusting operation.

6. In an instrument of the type described, the combination of an index, a depressor arranged to be intercepted by said index, a housing enclosing said index and depressor, and a plunger extending through said housing and operable from the exterior of said housing for restraining said depressor away from the index.

7. In an instrument of the type described, the combination of an index movable in a plane, a depressor arranged to beat across said plane and to be intercepted by said index in certain positions thereof, an adjusting means for said depressor whereby the depressor may be adjusted to different positions, and a part operated by engagement of a tool with said means incident to the adjusting operation for holding said depressor out of the plane of the index.

8. The combination with an index movable in a plane, of a swivelled support, means for adjustably positioning said support, a depressor pivoted to said support and arranged to beat across said plane and to be intercepted by said index in certain positions thereof and means operable as an incident to the adjusting operation for biasing said depressor out of the plane of the index.

9. The combination with a pivoted index adapted to deflect in a plane, of a swivelled member mounted to turn on an axis coincident with the pivot of said needle, a depressor pivoted to said member and adapted to have one end thereof beat across the plane of the index and the other end thereof terminating substantially coincident with the pivotal axis of said index, operating means including a finger coacting with the said other end of the depressor, means for adjustably positioning said swivelled member and depressor and means operable incident to an adjusting operation for depressing said finger to elevate the depressor above the plane of the index.

10. The combination with an index deflectable in a plane, of a swivelled target for coaction with said index to indicate predetermined conditions, means for adjusting said target to different positions, a depressor pivotally supported by said target intermediate its ends and adapted to beat across said plane of movement of the index, operating means for oscillating said depressor and means automatically operable incident to a resetting operation for elevating the depressor above of the plane of the index.

11. The combination with an index deflectable in a plane, of a target coacting with said index to indicate predetermined positions, pivotal means for said target substantially coincident with the rotative axis of said index, adjusting means for said target, a depressor pivoted to said target and adapted to beat across the plane of the index and to be intercepted thereby in certain positions thereof, the rear end of said depressor terminating substantially coincident with the rotative axis of said index, and operating means comprising a finger coacting with the rear end of said depressor substantially in alignment with the rotative axis of said index so that the target may be adjusted to different positions without disturbing the connection between the finger and the depressor.

12. The combination with an index movable in a plane, of a target coacting with said index, pivot means for mounting said target to turn around an axis substantially coincident with the rotative axis of the index and means for adjusting the position of said target comprising a rotatable member provided with an arm, and a link interconnecting said arm and target whereby rotation of said member causes movement of said target, together with a depressor engaging said index and a plunger movable axially of said rotatable member and shifting the depressor away from the index.

13. The combination with an index movable in a plane, of a target coacting with said index, pivot means for mounting said target to turn around an axis substantially coincident with the rotative axis of the index and means for adjusting the position of said target comprising a rotatable member provided with an arm, and a link interconnecting said arm and target whereby rotation of said member causes movement of said target.

ALBERT F. SPITZGLASS.
OTTO T. HANDWERK.